United States Patent
Ko et al.

(10) Patent No.: US 11,792,380 B2
(45) Date of Patent: Oct. 17, 2023

(54) VIDEO TRANSMISSION METHOD, VIDEO PROCESSING DEVICE, AND VIDEO GENERATING SYSTEM FOR VIRTUAL REALITY

(71) Applicant: FUNIQUE VR STUDIO, Kaohsiung (TW)

(72) Inventors: Ya-Ching Ko, Tainan (TW); Cheng Hung Tsai, Miaoli County (TW)

(73) Assignee: FUNIQUE VR STUDIO, Kaohsiung (TW)

( * ) Notice: Subject to any disclaimer, the term of this patent is extended or adjusted under 35 U.S.C. 154(b) by 120 days.

(21) Appl. No.: 17/490,370

(22) Filed: Sep. 30, 2021

(65) Prior Publication Data
US 2023/0057768 A1  Feb. 23, 2023

(30) Foreign Application Priority Data
Aug. 17, 2021 (TW) ................ 110130357

(51) Int. Cl.
| | |
|---|---|
| H04N 13/139 | (2018.01) |
| H04N 7/01 | (2006.01) |
| H04N 13/194 | (2018.01) |
| H04N 5/262 | (2006.01) |
| H04N 13/161 | (2018.01) |
| H04L 65/70 | (2022.01) |

(52) U.S. Cl.
CPC .......... *H04N 13/139* (2018.05); *H04L 65/70* (2022.05); *H04N 5/2621* (2013.01); *H04N 7/0122* (2013.01); *H04N 7/0125* (2013.01); *H04N 13/161* (2018.05); *H04N 13/194* (2018.05)

(58) Field of Classification Search
CPC .. H04N 13/139; H04N 5/2621; H04N 7/0122; H04N 7/0125; H04N 13/161; H04N 13/194; H04N 21/23602; H04N 21/4342; H04N 21/816; H04N 5/2624; H04N 5/2628; H04N 5/265; H04L 65/70; H04L 65/61; H04L 65/765
USPC ........................................................... 348/43
See application file for complete search history.

(56) References Cited

U.S. PATENT DOCUMENTS

| | | | |
|---|---|---|---|
| 11,445,255 B2* | 9/2022 | Li .................. | H04N 21/4316 |
| 2003/0053797 A1* | 3/2003 | Oshima ............ | H04N 19/597 |
| | | | 348/E13.059 |
| 2010/0289947 A1* | 11/2010 | Okuda ............ | H04N 21/41407 |
| | | | 348/E7.001 |
| 2014/0376803 A1 | 12/2014 | Chiang et al. | |

(Continued)

OTHER PUBLICATIONS

Non-final Office Action and Search Report of TW family patent Application No. 110130357, dated Feb. 18, 2022.

(Continued)

*Primary Examiner* — Helen Shibru
(74) *Attorney, Agent, or Firm* — WPAT, P.C., INTELLECTUAL PROPERTY ATTORNEYS; Anthony King

(57) ABSTRACT

The disclosure provides a video transmission method for virtual reality. The method includes reorganizing a first video and a second video obtained to generate a third video suitable for transmission through a physical wire, hence avoiding distortion caused by compression of a high-definition video. The disclosure further includes a video processing device and a video generating system employing the video transmission method.

20 Claims, 4 Drawing Sheets

(56) References Cited

U.S. PATENT DOCUMENTS

| | | | |
|---|---|---|---|
| 2016/0269711 A1* | 9/2016 | Hwang | H04N 13/161 |
| 2020/0077070 A1 | 3/2020 | Takahashi et al. | |
| 2021/0195161 A1 | 6/2021 | Racape et al. | |
| 2022/0058396 A1* | 2/2022 | Chen | G06V 10/454 |

OTHER PUBLICATIONS

English translation of the Non-final Office Action and Search Report of TW family patent Application No. 110130357, dated Feb. 18, 2022.

* cited by examiner

VIDEO TRANSMISSION METHOD, VIDEO PROCESSING DEVICE, AND VIDEO GENERATING SYSTEM FOR VIRTUAL REALITY

FIELD OF THE INVENTION

Embodiments of the disclosure relate to a video transmission method, a video processing device and a video generating system for virtual reality, and particularly, to a method, device and system for video processing in response to limitations of a transmission format before the use of a physical wire for transmitting a high-definition video, hence preventing a high-definition video needed for virtual reality from being limited by the transmission format of the physical wire and hence avoiding distortion inevitably caused by compression.

BACKGROUND

The development of wireless mobile network technology has provided more opportunities for the use of greater transmission bandwidths and more diverse application services. Virtual reality (VR) is a result of the development combining techniques including computer graphics, computer simulation, artificial intelligence, sensing, display and network parallel processing, and uses a three-dimensional virtual world to provide users a comprehensive and perceptible artificial environment including auditory and haptic perception, in a way that an immersive visual perception in such environment is produced to allow direct observation, manipulation and touching of the ambient environment and inner changes of things and hence interaction, giving users the sense of reality. By combining video streaming developed under real-time high-speed wireless mobile networking and the VR technology, a three-dimensional virtual world is capable of presenting a real scene in real time, offering users enjoyment of realistic immersive experience without being at the scene.

SUMMARY OF THE INVENTION

A video transmission method for virtual reality is provided according to an embodiment of the disclosure. The video transmission method includes steps of: obtaining a first video and a second video, both the first video and the second video having a 2:1 aspect ratio; segmenting the second video from a short side of the second video to generate two first sub videos having a same aspect ratio; segmenting the first sub videos from a long side of one of the first sub videos to generate three second sub videos having a same aspect ratio; generating a third video, wherein the third video includes the first video, the non-segmented first sub video and the three second sub videos, and a short side of the third video is formed by a short side of the first video and a short side of the non-segmented first sub video, and the other short side of the third video is formed by three short sides of the three second sub videos, such that the third video has a 16:9 aspect ratio; and transmitting the third video through a physical wire.

A video processing device for virtual reality is provided according to another embodiment of the disclosure. The video processing device includes a video input mechanism, a video processing mechanism and a video output mechanism. The video input mechanism is configured to receive a first original video and a second original video obtained from a first camera device. The video processing mechanism is in transmission connection to the video input mechanism, and includes a video processing unit configured to adjust the first original video and the second original video to a first video and a second video, and the video processing unit is configured to further combine the first video and the second video into a third video having a 16:9 aspect ratio. Dimensions of the third video are a total of those of the first video and the second video. The video output mechanism is in transmission connection to the video processing mechanism, and is for outputting the third video through a physical wire.

A video generating device for virtual reality is further provided according to yet another embodiment of the disclosure. The video generating device includes a first camera device, a video processing device and a streaming encoder. The video processing device is in transmission connection to the first camera device, and is configured to adjust a plurality of original videos obtained by the first camera device to a plurality of virtual reality videos, wherein the virtual reality videos are combined to generate a transmission video having a 16:9 aspect ratio. The streaming encoder is in transmission connection to the video processing device through a physical wire, and is configured to convert the transmission video into a streaming signal.

BRIEF DESCRIPTION OF THE DRAWINGS

Embodiments of the disclosure are described in detail with the accompanying drawings below for better understanding. It should be noted that, the structures are not drawn to scale according to a standard practice in the industry. In fact, to provide the clarity of the disclosure, sizes of the structures may be increased or decreased as desired.

DETAILED DESCRIPTION

Figure 1:
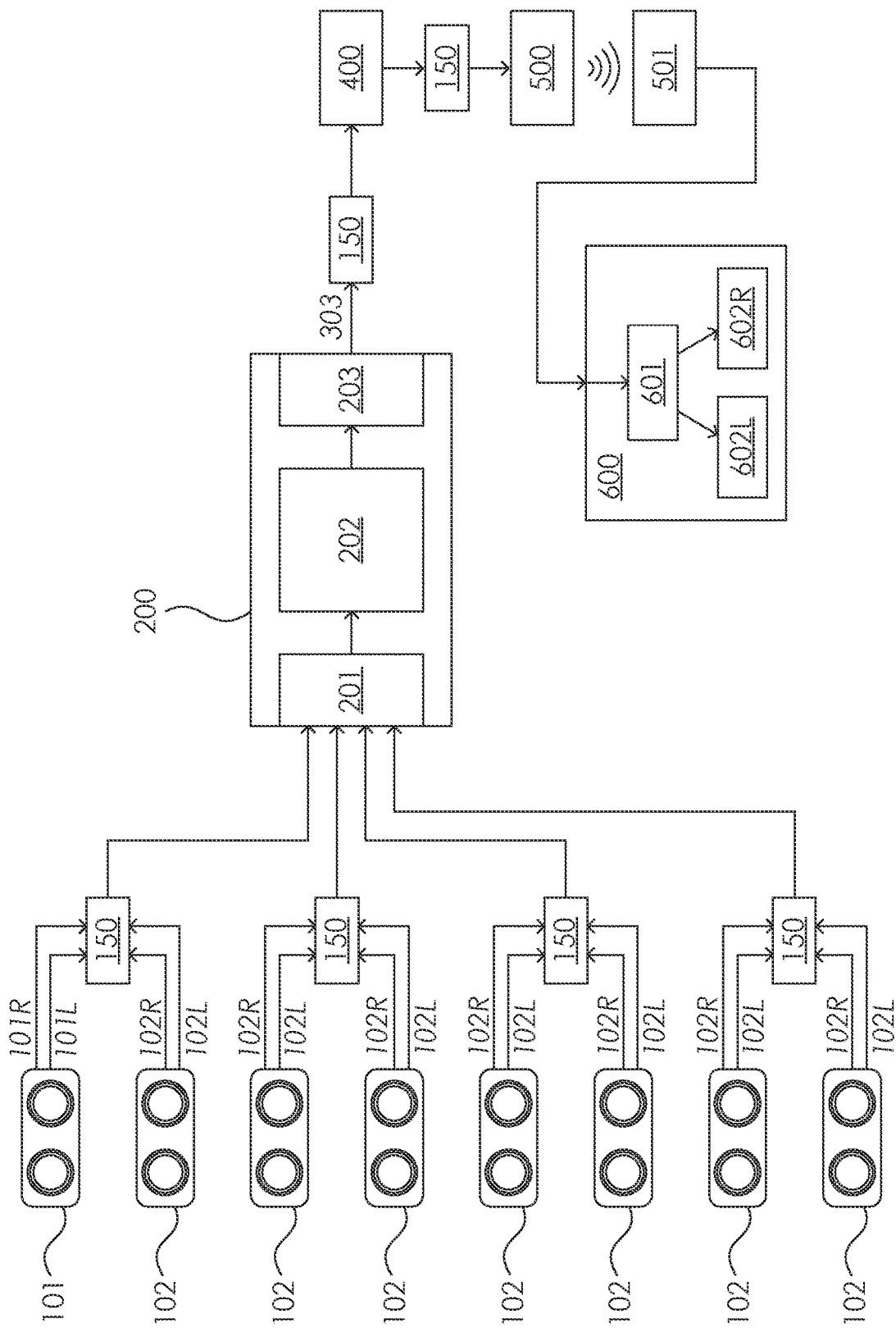
FIG. 1 is a structural schematic diagram of a video generating system according to some embodiments of the disclosure.

The disclosure below provides various different embodiments or examples of different components used to implement the subject matter of the disclosure. Specific examples of components and configurations are given in the description below to simplify the disclosure. It should be noted that these components and configurations are exemplary and are not intended to be restrictive. For example, in the description below, a first component formed on or above a second component may also include an embodiment in which the first component and the second component are formed in a direct contact manner, and may include an embodiment in which an additional component is formed between the first component and the second component in a way that the first component and the second component may not be in direct contact. Moreover, numerals and/or alphabetical symbols may be repeated in the various embodiments of the disclosure. Such repetition is intended for simplicity and clarity and does not represent relations between the embodiments and/or configurations.

Further, for better description, relative spatial terms such as "below", "under", "underneath", "above", "on", and "over" and the like may be used to describe the relation between one element or component and other element(s) or component(s) as given in the drawings. In addition to the orientation depicted in the drawings, the relative spatial terms are also intended to cover different orientations of a device in use or in operation. An apparatus may be orientated by other means (rotated by 90 degrees or having another orientation), and descriptive relative spatial terms used herein may also be similarly interpreted.

As used herein, terms such as "first", "second" and "third" are used to describe various elements, components, regions, layers and/or sections, and these elements, components, regions, layers and/or sections are not to be restricted by these terms. These terms are used to differentiate one element, component, region, layer or section from another element, component, region, layer or section. Unless otherwise specifically indicated in the context, the terms such as "first", "second" and "third" do not imply a sequence or order when used herein.

In some embodiments of the disclosure, virtual reality, and more particularly, virtual reality combining the real-time streaming technique, is established, to ensure that a virtual reality video experienced by a user has high definition (for example, meeting the definition standard that is at least 6K). Accordingly, a video processing method for current hardware environments is provided to ensure that a real-time video thus obtained is, without compromising any video quality, transmitted by combing different means including a physical wire and network streaming and then accurately presented at a user end, offering the user with quality feelings of presence.

As shown in the structural diagram of a video generating system in FIG. 1, in some embodiments, at least one first camera device 101 may be arranged to obtain a dynamic real-time video serving as at least a part of specific video contents restored in a virtual space created at a user end by the virtual reality technology. In some embodiments, the first camera device 101 is a camera having at least two lenses. For example, the first camera device 101 may include horizontally arranged dual fisheye lens to simulate the left and right eyes of a human and the distance therebetween, so as to obtain videos with respect to different fields of view of the simulated left and right eyes of the human. The videos are combined and processed by image processing techniques to generate a three-dimensional video having a sense of depth.

In some embodiments, the first camera device 101 has a function of capturing a 180-degree video, and is capable of generating a 180-degree three-dimensional video using visible fields of view of the simulated left and right eyes of the human in combination with the horizontally arranged dual fisheye lens above, so as to establish a virtual environment in a three-dimensional video.

In some embodiments, the video generating system may further include at least one second camera device 102. The second camera device 102 has hardware specifications identical to those of the first camera device 101, and so the second camera device 102 is also capable of capturing a 180-degree video. Further, in some embodiments, the first camera device 101 and the second camera device 102 may provide different scenario angles. For example, in live broadcast of an art and cultural performance activity or a sport competition event, the first camera device 101 and the second camera device 102 are arranged at different positions of a venue of the activity or the competition, so as to provide different scenario angles for observation and experience of a user. In another embodiment, a combination of the first camera device 101 and the second camera device 102 may provide a 360-degree video; that is, the 180-degree videos respectively obtained by the first camera device 101 and the second camera device 102 are combined into a 360-degree video. When more second camera devices 102 are provided, more combinations of two of the second camera devices 102 may also be used to obtain a 360-degree video captured at different capturing positions.

To enhance the sense of reality of virtual reality, resolutions of original videos generated by the first camera device 101 and the second camera device 102 need to be in certain levels. In some embodiments, the first camera device 101 and the second camera device 102 need to be at least capable of outputting 4K resolution or higher. In some embodiments, high-resolution videos provided by the first camera device 101 and the second camera device 102 have a 50 fps frame rate or more. In some embodiments, the first camera device 101 and the second camera device 102 have at least a chroma sampling specification of 4:2:2. In some embodiments, the first camera device 101 and the second camera device 102 can support a color depth specification up to 10-bits. In some embodiments, in order to match with limitations of software operation performance or specifications of other hardware systems, the first camera device 101 and the second camera device 102 may provide other color depth specifications that can be supported during the actual operation, for example, providing videos having a 8-bit color depth.

In order to achieve the object of processing a high-resolution video into a video complying with a virtual reality standard (or referred to as a VR video), as shown in FIG. 1, in some embodiments, the first camera device 101 and the second camera device 102 are in transmission connection to a video processing device 200 to perform virtual reality processing on original videos obtained by the camera device(s). In some embodiments, the video processing device 200 is deployed on a real site of live broadcast of an art and cultural performance activity or sport competition event. In other words, for a virtual reality user (or referred to as a spectator), the first camera device 101, the second camera device 102 and the video processing device 200 are all "remote-end" apparatuses, and the virtual reality user can acquire an immersive experience using a "near-end" virtual reality device through high-speed, high-bandwidth and low-delay communication techniques, hence achieving a live broadcast mode of virtual reality. For a service provider of virtual reality live broadcast, processes including acquisition of high-resolution videos, virtual reality processing of the high-resolution videos and rendering customized special effects to the videos are completed by the "near-end" first camera device 101, second camera device 102 and video processing device 200 deployed on a real site. Then, the videos of the real site are provided for real-time experience to the virtual reality user at a "remote end" of the service provider by the real-time streaming communication technique with no need to be present in the real site, further at the same time allowing the virtual reality user to enjoy added functions such as special effects, freely switching of fields of view as desired, and viewing of competition data and results.

Since the first camera device 101, the second camera device 102 and the video processing device 200 are all located at a near end of the service provider of the virtual reality live broadcast, in some embodiments, the camera devices including the first camera device 101 and the second camera device 102 perform data transmission with the video processing device 200 through physical wires. In some embodiments, the camera devices and the video processing device 200 are connected by a Serial Digital Interface (SDI) 150 in between. In some embodiments, the SDI 150 may be in the form of a board and has four input ports, and may thus be connected to one first camera device 101 and one second camera device 102, that is, left-eye and right-eye field-of-view videos (101L and 101R) of the first camera device 101 as well as left-eye and right-eye field-of-view videos (102L and 102R) of the second camera device 102 are inputted to the video processing device 200 through different input ports of one SDI 150. In some other embodiments, assuming that eight camera devices (one first camera device 101 and seven second camera devices 102) are used for example, original videos obtained by the camera devices are inputted to the video processing device 200 using four SDIs 150. In some embodiments, videos captured by camera devices such as the first camera device 101 and the second camera device 102 have 4K definition standard, and are outputted in the form of SDI signals having a 3840*2160 resolution and a 16:9 aspect ratio to the video processing device 200. However, the disclosure does not in fact limit the specific specification of the SDI 150, and appropriate hardware apparatuses may be used according to the development of communication transmission interfaces.

In some embodiments, the first camera device 101, the second camera device 102 and the video processing device 200 include transmission such as SDI signals using coaxial cables in between. In some embodiments, the camera devices and the video processing device 200 include optical fiber cables and/or SDI-optical converters in between; that is, the camera devices and the video processing device 200 may also perform transmission through optical fiber cables or a combination of optical fiber cables and coaxial cables. In some other embodiments, video transmission may also be performed using a more economical High-Definition Multimedia Interface (HDMI) or DisplayPort (DP) and corresponding HDMI wires and DP wires.

In some embodiments, the video processing device 200 has a function of processing an original video in real time into a virtual reality video. The first camera device 101 and the second camera device 102 do not need to be virtual reality cameras (that is, the first camera device 101 and the second camera device 102 do not belong to virtual reality camera devices), and so this means that the camera devices do not need to have a function of directly outputting virtual reality videos. Therefore, in the present disclosure, first of all, the virtual reality processing is performed by the video processing device 200, and thus a high cost caused by a large number of virtual reality camera devices deployed on a real site can be avoided. Secondly, a virtual reality camera device is usually capable of achieving virtual reality videos having coarse quality as being limited by hardware specifications thereof, which does not meet the requirement for the level of definition. Moreover, if a virtual reality camera device outputting a virtual reality video is employed in the system, it means that it may be difficult to perform customized post-processing and editing of the virtual reality video. Therefore, the first camera device 101 and the second camera device 102 employed in the present disclosure are not virtual reality camera devices, instead, they are used to obtain original videos, and then post-processing and virtual reality processing of all videos are completed by using the video processing device 200.

Figure 2:
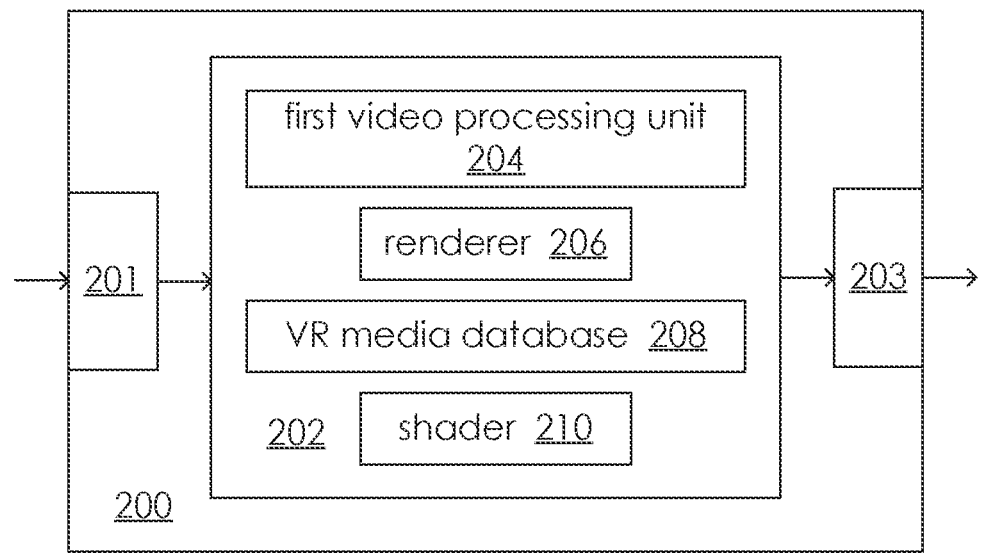
FIG. 2 is a structural schematic diagram of a video processing device according to some embodiments of the disclosure.

In some embodiments, the video processing device 200 is a switcher having a function of performing virtual reality processing on a video. In some embodiments, as shown in FIG. 2, the video processing device 200 for virtual reality of the disclosure includes a video input mechanism 201, a video processing mechanism 202 and a video output mechanism 203. In some embodiments, the video input mechanism 201 is for receiving a first original video and a second original video (for example, the left-eye field-of-view video 101L and the right-eye field-of-view video 101R that have not yet undergone virtual reality processing) obtained by the first camera device 101. If the video processing device 200 is in transmission connection to at least one second camera device 102, the video processing device 200 may also receive a third original video and a fourth original video (for example, the left-eye field-of-view video 102L and the right-eye field-of-view video 102R that have not yet undergone virtual reality processing) obtained by the second camera device 102. Similar to the first original video and the second original video which originate from different fields of view of the simulated left and right eyes, the third original video and the fourth original video also correspond to different fields of view based on the same principle.

Due to the possibility of multiple camera devices used, in some embodiments of the present disclosure, the video input mechanism 201 includes an input management unit (not shown). Thus, in addition to the video from the first camera device 101, switching between different video sources may be performed using the input management unit, for example, switching to receive the third original video and the fourth original video obtained from the second camera device 102.

In some embodiments, by a first video processing unit 204 of the video processing mechanism 202, the first original video and the second original video can be adjusted to a first video 301 and a second video 302 (to be described with reference to FIG. 3) that meet virtual reality requirements. In some embodiments, the first video processing unit 204 is a graphics processing unit (GPU). For example, adjustment performed by the first video processing unit 204 of the video processing mechanism 202 on the original videos may include video stitching. As described above, the first video device 101 may capture a 180-degree video, and so in some embodiments, the left-eye field-of-view video 101L and the right-eye field-of-view video 101R captured by the first camera device 101 are 180-degree videos from different fields of view, and the left-eye field-of-view video 102L and the right-eye field-of-view video 102R captured by the second camera device 102 are 180-degree videos from different fields of view. In some embodiments, the left-eye field-of-view videos 101L and 102L in a 180-degree video specification are stitched into the first video 301 having a 360-degree video specification, and the right-eye field-of-view videos 101R and 102R in a 180-degree video specification are stitched into the second video 302 having a 360-degree video specification. The first video 301 and the second video 302 are 360-degree videos which include two 180-degree videos (not a continuous 360-degree panoramic video but a 360-degree video having contents of two 180-degree videos). After being transmitted to a virtual reality device, the first video 301 and the second video 302 are respectively projected onto left-eye and right-eye display mechanism of the virtual reality device, so as to offer a user with a sense of three-dimensional virtual reality video. It should be noted that, the first video and the second video of the disclosure are not limited to being corresponding to the left-eye field of view and the right-eye field of view, the description above merely provides examples, and the correspondence between the two may be swapped.

In some embodiments, the video processing mechanism 202 may include and operate a renderer 206, which renders a special effect to the first video 301 and the second video 302. The special effect may include numerous aspects. For example, in order to pass the sense of thrill and excitement of a real site to a virtual reality user, the first video 301 and the second video 302 may be rendered with a special effect for the purpose of enhancing visual effects (VFX), such as providing different and customized special effects with respect to art performances, concerts or sport competition events. Moreover, the special effect rendered may also include data analysis information provided by a third party, such as contents including weather information, game scores of sport competition events, competition analysis, player's data and information and sport scientific information which are rendered to the first video 301 and the second video 302, allowing a virtual reality user to experience three-dimensional virtual reality videos and to browse images to obtain more information that help enhance the effects of experience.

In some embodiments, the video processing mechanism 202 may include and operate or access a virtual reality media database 208 so as to obtain video materials and to feed in videos including common on-site live broadcast videos, advertisement videos, close-ups, slow motions and highlight playbacks. In some embodiments, the virtual reality media database 208 may also provide customized styles such as different subtitles, flashcards or backgrounds as well as animation effects, so as to easily superimpose in combination with the function of the first video processing unit 204 of the video processing mechanism 202 one or more layers onto the first video 301 and the second video 302.

In some embodiments, the first video processing unit 204 of the video processing mechanism 202 may perform video processing procedures such as color correction, brightness and contrast adjustment, dimming, position adjustment, truncation and scaling on the first video 301, the second video 302, special effects to be rendered or video contents added. In some embodiments, a virtual reality scene may also be captured using only one camera device, and real-time background removal may be performed using the first video processing unit 204 or further in combination with the function of the renderer 206, so as to achieve a green screen video synthesis function in the virtual reality scene.

Figure 3:
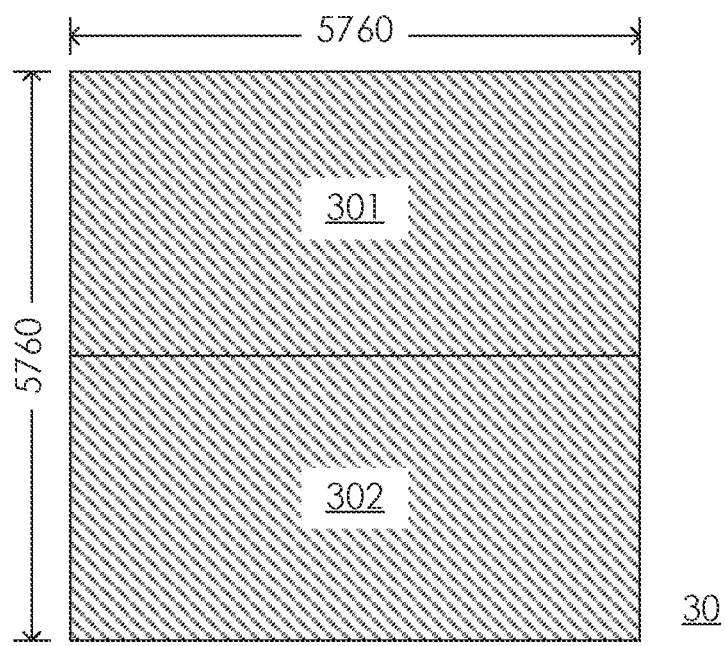
FIG. 3 is a schematic diagram of a combination of a first video and a second video according to some embodiments of the disclosure.

As described above, to enhance the sense of reality of virtual reality, the resolutions of the original videos generated by the first camera device 101 and the second camera device 102 need to be in certain levels, for example, having at least 4K definition standard, and at least a 3840*2160 resolution. The video that has been processed by the first video processing unit 204 of the video processing mechanism 202, as shown in FIG. 3, for example, the first video 301 and the second video 302 formed by stitching, may have at least a 5760*2880 resolution, and the first video 301 and the second video 302 may be combined into a virtual reality video 30 having a 1:1 aspect ratio and a resolution format that can be used by the virtual reality device (the first video 301 and the second video 302 are synchronously displayed on left-eye and right-eye display mechanisms of the virtual reality device). Moreover, in some embodiments, the virtual reality video 30 has at least a 5760*5760 resolution, that is, having at least 6K resolution. If the resolution of the virtual reality video 30 is inadequate, for example, the long sides of the first video 301 and the second video 302 included are less than 5760 pixels and under 6K resolution accordingly, blurriness may be resulted in a visual environment of the virtual reality user to severely restrain the sense of experience of the virtual reality user. However, under current standard specifications, a physical wire for outputting to a downstream streaming encoder does not support the resolution format having a 1:1 aspect ratio. Therefore, the disclosure provides a video transmission method for virtual reality that outputs the virtual reality video 30 without affecting the video quality.

Specifically, in some embodiments, the video processing device 200 includes the video output mechanism 203, which is in transmission connection to the video processing mechanism 202 and is for outputting through a physical wire a video that has been processed by the video processing mechanism 202. In addition, before the video processing device 200 outputs the virtual reality video 30 that is then converted to a streaming signal, transmission through a physical wire first needs to be performed. The physical wire may include the SDI 150 and corresponding SDI cables that support up to 8K resolution. Alternatively, in other embodiments, the HDMI or DP and corresponding cables that support up to 8K resolution may be included as well. Taking the SDI as a transmission interface commonly used for high-quality videos for example, although a physical wire including the SDI 150 and the corresponding SDI cables can support 8K resolution and thus meet requirements for transmitting the high-resolution virtual reality video 30, such physical wire supports only a video format having a 16:9 aspect ratio and is incompatible with the virtual reality video 30 having a 1:1 aspect ratio. That is to say, in the practice of high-quality video transmission, the resolution specification of a video may be restrained by the standard supported by the transmission interface used. Thus, how to perform high-quality video transmission using a transmission interface such as the SDI restrained by a transmission specification while meeting the requirements of high-quality video transmission outside existing transmission specifications is one task to be resolved in the related technical field. In one comparative example, in view that the SDI 150 supports only a video format having a 16:9 aspect ratio, the video processing device adjusts by means of lossy compression the virtual reality video 30 having a 1:1 aspect ratio to a resolution format having a 16:9 aspect ratio, for example, compressing the virtual reality video 30 from a 5760*5760 format to a 5760*3240 format, and then the 5760*3240 format of the compressed virtual reality video 30 is restored by a virtual reality device at the user end to a 5760*5760 format having a 1:1 aspect ratio. However, in this comparative example, a part of video information is lost during the process of compressing the virtual reality video 30 from a 1:1 aspect ratio to a 16:9 aspect ratio, and according to the Information Theory, the lost information cannot be restored after the lossy compression. Thus, the resolution of the video restored by the virtual reality device at the user end inevitably is poorer than that of the virtual reality video 30 before the compression. The embodiment of the disclosure is capable of solving the problem above by first segmenting and reorganizing the virtual reality video 30 using the video processing device 200, while being compatible with existing physical wires supporting high-resolution video transmission (e.g., including the SDI 150) standards. Associated details are given below.

Figure 4A:
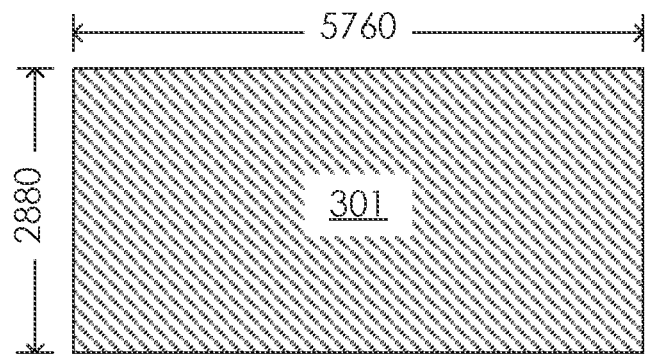
FIG. 4A is a schematic diagram of resolutions of a first video and a second video according to some embodiments of the disclosure.
Figure 4A:
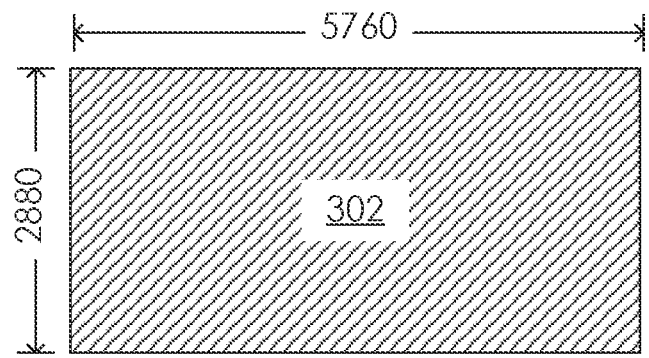
Figure 4B:
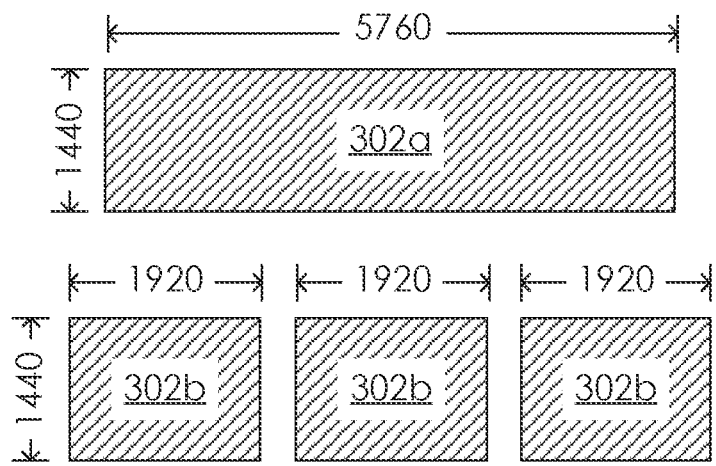
FIG. 4B is a schematic diagram of resolutions of a segmented second video according to some embodiments of the disclosure.
Figure 4C:
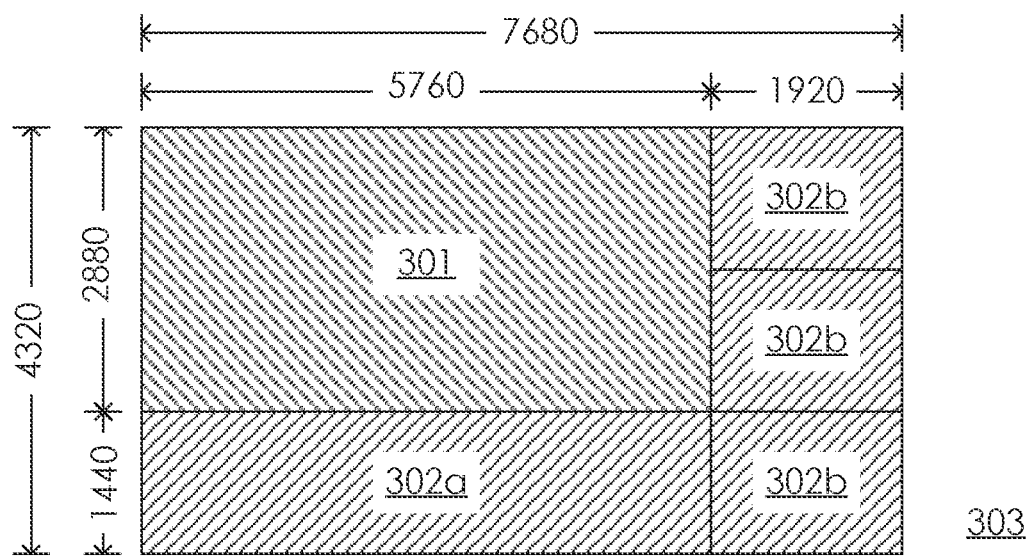
FIG. 4C is a schematic diagram of a resolution of a third video according to some embodiments of the disclosure.

Referring to FIG. 4A, the first video 301 and the second video 302 generated by the first video processing unit 204 both have a 2:1 aspect ratio, and would have been combined into the virtual reality video 30 in a resolution format having a 1:1 aspect ratio. However, in some embodiments of the disclosure, as shown in FIG. 4B, the second video 302 is segmented from a short side of the second video 302 to generate two first sub videos 302a having the same aspect ratio, and the first sub videos 302a is segmented from a long side of one of the first sub videos 302a to generate three second sub videos 302b having the same aspect ratio. Thus, as shown in FIG. 4C, a third video 303 can be formed. The third video 303 includes the first video 301, the non-segmented first sub video 302a, and three second sub videos 302b. Moreover, a short side of the third video 303 is formed by a short side of the first video 301 and a short side of the non-segmented first sub video 302a, and the other short side of the third video 303 is formed by three short sides of the three second sub videos 302b, such that the third video 303 has a 16:9 aspect ratio.

Taking a specific resolution for example, in the embodiment above, the first video 301 and the second videos 302 may have a 5760*2880 resolution, and the two would have been combined into the virtual reality video 30 having a 5760*5760 resolution. However, as shown in FIG. 4C, after the segmenting and reorganizing of the embodiment above, the long side of the first sub video 302a having a 5760*1440 resolution is aligned with the long side of the first video 301 having a 5760*2880 resolution, and the short sides of the three second sub videos 302b having a 1920*1440 resolution are connected in common to the short sides of the first video 301 and the first sub video 302a. After the reorganizing, the third video 303 thus generated has a 7680*4320 resolution, that is, a video having 8K resolution and a 16:9 aspect ratio, and may be transmitted through a physical wire.

The third video 303 generated by the video processing device 200 of the disclosure has an aspect ratio that is changed by means of segmenting and reorganizing, that is, only pixels of the video are rearranged and reorganized without performing any compression or restoration on the definition. Thus, the dimensions of the third video 303 transmitted by a physical wire are a total of those of the first video 301 and the second video 302.

In some embodiments, the step of segmenting the second video 302 so as to combine with the first video 301 into the third video 303 may be completed by a shader 210 operated by the video processing mechanism 202. The shader 210 may generate an instruction for the first video processing unit 204 to process and modify the pixels of the first video 301 and the second video 302. One benefit of using the shader 210 to generate the third video 303 is that the first video processing unit 204 is given an instruction in a low-level language featuring high-efficiency, thus preventing additionally using video post-production software to perform video editing using a high-level language and reducing operation performance depletion of the first video processing unit 204.

In some embodiments, before the second video 302 is segmented, a special effect is rendered to the first video 301 and the second video 302 by the renderer 206. In other words, the generating of the third video 303 having a non-1:1 aspect ratio is a special process performed in response to the specification limitations of a physical wire. Thus, before the third video 303 is generated, virtual reality processing and adjustment and addition of visual effects needed for the first video 301 and the second video 302 must have been completed.

In some embodiments, the segmented video may be the first video 301 instead of the second video 302. In other words, given that either one of the first video 301 and the second video 302 is segmented, the segmented video may be reorganized with the other non-segmented video to form a video having a 16:9 aspect ratio and be transmitted through a physical wire. Moreover, FIG. 4A to FIG. 4C of the disclosure show merely examples of video segmenting and reorganizing forms, and do not impose limitations on the sequence of steps in this disclosure regarding the segmenting and reorganizing of the virtual reality video by the shader 210 in response to the limitations of the transmission format of a physical wire.

Using the technical solution of segmenting and organizing a video as described above, the disclosure skillfully arranges the virtual reality video 30 having a 1:1 aspect ratio into having a 16:9 aspect ratio. As a result, this does not compromise the resolution of the virtual reality video 30, and at the same time fully utilizes the bandwidth of a physical wire without producing any bandwidth waste in the transmission process.

In some embodiments, the video processing mechanism 202 may include and operate a user interface (UI). The UI is for an operating individual of the video processing device to select the source (for example, a combination of the first camera device and the second camera device above, or a combination of two other second camera devices) of the video, so as to check the video and then confirm the visual effect rendered, the quality of the virtual reality processing, and operations such as selection and other related editing of videos.

As described above, the video output mechanism 203 is in transmission connection to the video processing mechanism 202, and outputs through a physical wire the video completely processed by the video processing mechanism 202, wherein the video is the third video 303. In some embodiments, the video processing device 200 is a switcher having a function of performing virtual reality processing on a video. In some embodiments, the video processing device 200 may be a machine group consisting of a plurality of computers connected to one another, which perform different functions and process a video to be outputted.

As shown in FIG. 1, in some embodiments, the video generating system includes a storage device 400. The storage device 400 is in transmission connection to the video processing device 200, and is for storing a video (that is, the third video 303) outputted by the video processing device 200. The storage device 400 functions as a data backup, and in some other embodiments, the video generating system may exclude the storage device 400.

In some embodiments, the video generating system includes a streaming encoder 500. The streaming encoder 500 is in transmission connection to the video processing device 200 through a physical wire, and is for converting the third video 303 outputted by the video processing device 200 into a streaming signal. For example, the third video 303 having a 16:9 aspect ratio may be encoded by the streaming encoder 500 into an HTTP live streaming (HLS) signal, which is then further transmitted to a remote end using an existing wired or wireless network transmission structure. For example, using the 5G transmission technology suitable for high-definition videos, the HLS signal is transmitted to a server 501 of a content delivery network (CDN) of a telecommunication service provider, for a user to download the HLS signal in real time. The process above is merely an example of a signal transmission mode and route of sending in real time a video from a "remote end" close to the real site in the proximity of the first camera device 101, the second camera device 102, and the video processing device 200 to a "near end" in the proximity of a virtual reality user, so as to create a virtual reality space. It should be noted that the example does not impose limitations on the technical solution of performing video transmission through a non-physical wire above.

In some embodiments, the video generating system includes a virtual reality device 600. The virtual reality device 600 is for receiving a streaming signal, and decoding the streaming signal into the video originally outputted from the video processing device 200. To adapt to the signal format restrictions of a physical wire, after the first video 301 and the second video 302 that have undergone virtual reality processing are segmented and reorganized as above, they depart in the form of the third video 303 having a 16:9 aspect ratio from the video processing device 200, and are converted into the streaming signal by the streaming encoder 500 and eventually transmitted to the virtual reality device 600. At this time point, in order for the virtual reality user to correctly read the video, the streaming signal is first decoded and again converted into the third video 303, and the decoded third video 303 needs to again undergo video segmenting and reorganizing because the third video 303 has a specific format for transmission. Thus, the third video 303 is restored/forms the first video 301 and the second video 302 again.

In some embodiments, the virtual reality device 600 includes a second video processing unit 601 that may be a GPU. The virtual reality device 600 may operate another shader (not shown) to generate an instruction for the second video processing unit 601 to process and modify the pixels of the third video 303, which then is restored from the resolution in the schematic diagram of FIG. 4C to the resolution in the schematic diagram of FIG. 3 above. Since the second video processing unit 601 may be integrated into a consumer-grade wearable device, benefits including high efficiency and low power consumption in contribution to restoring the third video 303 to the first video 301 and the second video 302 using the shader are further emphasized.

In some embodiments, after the third video 303 is reorganized into the virtual reality video 30 having a 1:1 aspect ratio, the first video 301 and the second video 302 in the virtual reality video 30 may be synchronously displayed by two display mechanisms in the virtual reality device 600, for example, a left-eye display mechanism 602L and a right-eye display mechanism 602R, allowing a virtual reality user to sense clear, three-dimensional, real-time and realistic live experience. Moreover, with customized special effects provided to the video or added contents such as data analysis information provided by a third party, a high standard sense of presence is made even more enjoyable.

In conclusion, in some embodiments of the disclosure, a video generating system for virtual reality is provided. The video generating system for virtual reality adjusts a plurality of original videos obtained by camera devices to a plurality of virtual reality videos using a video processing device for virtual reality provided by the disclosure. Moreover, in a video transmission method for virtual reality provided by the disclosure, the virtual reality videos are reorganized to generate a transmission video having a 16:9 aspect ratio. Thus, without compromising the resolution of the video, the transmission video may efficiently meet video signal format requirements of a physical wire, thereby achieving high-resolution three-dimensional real-time virtual reality streaming services.

Structures of several embodiments are given above for a person skilled in the art to better understand the aspects of the disclosure. It is understandable by a person skilled in the art that, designs and modifications may be easily made to other processes and structures on the basis of the disclosure so as to achieve the same objects and/or benefits of the embodiments described herein. Moreover, it is also understandable by a person skilled in the art that, these equivalent structures do not depart from the spirit and scope of the disclosure, and various changes, modifications and substitutions may also be made to the details of the disclosure without departing from the spirit and scope of the disclosure.

What is claimed is:

1. A video transmission method for virtual reality, the video transmission method comprising:
   obtaining a first video and a second video, both the first video and the second video having a 2:1 aspect ratio;
   segmenting the second video from a short side of the second video to generate two first sub videos having a same aspect ratio;
   segmenting the first sub videos from a long side of one of the first sub videos to generate three second sub videos having a same aspect ratio;
   generating a third video, wherein the third video comprises the first video, the non-segmented first sub video and the three second sub videos, and a short side of the third video is formed by a short side of the first video and a short side of the non-segmented first sub video, and the other short side of the third video is formed by three short sides of the three second sub videos, such that the third video has a 16:9 aspect ratio; and
   transmitting the third video through a physical wire.

2. The video transmission method of claim 1, wherein a long side of the first video at least has 5,760 pixels.

3. The video transmission method of claim 1, wherein the operations of segmenting the second video, segmenting the first sub videos and generating the third video comprise operating a shader in a video processing device, such that the segmented second video and the segmented first sub videos are reorganized with the first video into the third video.

4. The video transmission method of claim 1, further comprising:
   transmitting the third video to a streaming encoder through the physical wire, and converting the third video into a streaming signal by the streaming encoder.

5. The video transmission method of claim 4, further comprising:
   transmitting the streaming signal to a virtual reality device;
   decoding the streaming signal into the third video; and
   generating the first video and the second video using the third video.

6. The video transmission method of claim 5, wherein the operation of generating the first video and the second using the third video comprises operating a shader in the virtual reality device, and reorganizing the third video and outputting the first video and the second video to two display mechanisms of the virtual reality device, respectively.

7. The video transmission method of claim 1, before the operation of segmenting the second video, further comprising:
   rendering a special effect to the first video and the second video.

8. A method for processing video for non-compression transmission, the method comprising:
   receiving a first video and a second video, both the first video and the second video having a 2:1 aspect ratio;
   segmenting the second video from a short side of the second video to generate two first sub videos having a same aspect ratio;

segmenting the first sub videos from a long side of one of the first sub videos to generate three second sub videos having a same aspect ratio; and generating a third video compatible with a transmission standard of a physical wire, wherein the third video comprises the first video, the non-segmented first sub video and the three second sub videos, and a short side of the third video is formed by a short side of the first video and a short side of the non-segmented first sub video, and the other short side of the third video is formed by three short sides of the three second sub videos, such that the third video has a 16:9 aspect ratio.

9. The method of claim 8, wherein the first video is obtained from a left-eye field-of-view video captured by a video device.

10. The method of claim 9, wherein the second video is obtained from a right-eye field-of-view video captured by the video device.

11. The method of claim 8, wherein the first video is stitched from two left-eye field-of-view videos captured by two video devices, respectively.

12. The method of claim 11, wherein the second video is stitched from two right-eye field-of-view videos captured by the two video devices, respectively.

13. The method of claim 8, wherein the first video and the second video are 360-degree virtual reality videos of different fields of view.

14. The method of claim 8, further comprising:
rendering a special effect to the first video and the second video.

15. The method of claim 8, wherein the physical wire comprises Serial Digital Interface (SDI), High-Definition Multimedia Interface (HDMI) or DisplayPort (DP).

16. The method of claim 8, wherein a long side of the first video at least has 5,760 pixels.

17. The method of claim 16, wherein a short side of the first video at least has 2,880 pixels.

18. The method of claim 8, wherein a pixel number of the third video is a total of a pixel number of the first video and a pixel number of the second video.

19. The method of claim 8, wherein the third video has a 7680*4320 resolution.

20. The method of claim 8, wherein the operations of segmenting the second video, segmenting the first sub videos, and generating the third video are performed by a shader.

* * * * *